United States Patent
Brady et al.

(10) Patent No.: US 6,398,964 B1
(45) Date of Patent: *Jun. 4, 2002

(54) PROCESS FOR TREATING AQUEOUS WASTE CONTAINING COPPER AND COPPER CMP PARTICLES

(75) Inventors: Daun Marie Brady, Sugar Land; Michael Andrew Frisch, Austin, both of TX (US); Deon Eugene Campbell, Vancouver, WA (US); Thuy Nguyen, Houston; Dustin Kimbel James, Sugar Land, both of TX (US)

(73) Assignee: Koch Microelectronic Service Company, Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,196

(22) Filed: Aug. 19, 1999

(51) Int. Cl.⁷ .................. B01D 11/00; B01D 15/00
(52) U.S. Cl. .............. 210/638; 210/688; 210/691; 210/650; 210/651; 210/723; 210/195.2; 204/194; 204/DIG. 13
(58) Field of Search ............... 210/638, 639, 210/660, 663, 681, 688, 691, 650, 651, 723, 724, 725, 195.1, 195.2, 257.2, 767; 423/531; 204/194, DIG. 13

(56) References Cited

U.S. PATENT DOCUMENTS

| 1,324,118 A | 12/1919 | Hottinger et al. |
| 3,075,645 A | 1/1963 | Riddick |
| 3,097,163 A | 7/1963 | Riddick |
| 3,101,317 A | 8/1963 | Starry |
| 3,521,752 A | 7/1970 | Lindman |

(List continued on next page.)

FOREIGN PATENT DOCUMENTS

WO    WO 97/47380    12/1997

OTHER PUBLICATIONS

Aspila, K., et al., "Studies on the Stability of Dithiocarbamic Acids," Chemistry Department, Carleton University, Ontario, Canada, *Talanta*, 1969, vol. 16, pp. 1099 to 1102.

(List continued on next page.)

*Primary Examiner*—Ana Fortuna
(74) *Attorney, Agent, or Firm*—Shook, Hardy & Bacon LLP (57) ABSTRACT

A process for treating aqueous waste comprising a copper plating waste stream, a copper rinse stream containing organic carbon and solid particles, and a copper chemical mechanical planarization stream (CMP) containing solid particles is provided. This process includes electrowinning the copper plating waste stream to remove copper and create a blow down stream, filtering the rinse stream to remove solid particles, adding the blow down stream to the CMP stream, treating the blow down stream and the CMP stream with a flocculant or coagulant to form larger solid particles, removing the larger solid particles from the CMP stream and separating the resulting stream into a liquid containing copper, a concentrated regenerant, and a dilute regenerant, adding the concentrated regenerant to the waste stream before the electrowinning step, adding the dilute regenerant to the rinse stream before filtering to remove solid particles, and adding the liquid containing copper to the CMP stream during the treating step. The present invention further includes a system for treating aqueous waste that follows the above-described process.

17 Claims, 3 Drawing Sheets

U.S. PATENT DOCUMENTS

| | | | |
|---|---|---|---|
| 3,544,476 A | | 12/1970 | Aiba et al. |
| 4,016,075 A | | 4/1977 | Wilkins |
| 4,165,264 A | | 8/1979 | Satchell, Jr. |
| 4,188,291 A | | 2/1980 | Anderson |
| 4,207,183 A | | 6/1980 | Herrigel |
| 4,246,102 A | | 1/1981 | Hjelmener et al. |
| 4,260,493 A | | 4/1981 | Kretas et al. |
| 4,276,180 A | | 6/1981 | Matson |
| 4,357,220 A | * | 11/1982 | Elsenmann |
| 4,420,401 A | | 12/1983 | Kretas et al. |
| 4,437,994 A | * | 3/1984 | Baker |
| 4,450,057 A | | 5/1984 | Kelly |
| 4,504,356 A | | 3/1985 | Mulder et al. |
| 4,655,928 A | * | 4/1987 | Milton et al. |
| 4,731,187 A | | 3/1988 | Moriya et al. |
| 4,765,913 A | | 8/1988 | Featherstone |
| 4,780,211 A | | 10/1988 | Lien |
| 4,895,659 A | * | 1/1990 | Semmens et al. |
| 4,938,876 A | | 7/1990 | Ohsol |
| 4,957,634 A | | 9/1990 | Bowers, Jr. |
| 5,078,900 A | | 1/1992 | Wegner |
| 5,108,620 A | | 4/1992 | Wester et al. |
| 5,164,095 A | | 11/1992 | Sparapany et al. |
| 5,171,453 A | | 12/1992 | Communal |
| 5,182,023 A | | 1/1993 | O'Connor et al. |
| 5,205,939 A | | 4/1993 | Syrinek |
| 5,246,686 A | | 9/1993 | Cuer et al. |
| 5,453,206 A | | 9/1995 | Browne |
| 5,510,040 A | | 4/1996 | Miller et al. |
| 5,512,181 A | | 4/1996 | Matchett |
| 5,556,545 A | | 9/1996 | Volchek et al. |
| 5,575,915 A | | 11/1996 | Nakamura et al. |
| 5,605,633 A | | 2/1997 | Nakamura et al. |
| 5,609,765 A | | 3/1997 | Bowman |
| 5,620,629 A | | 4/1997 | Salmen et al. |
| 5,776,478 A | * | 6/1998 | Smith et al. |
| 5,871,648 A | | 2/1999 | Allen et al. |
| 5,965,027 A | * | 10/1999 | Allen et al. |

OTHER PUBLICATIONS

Harris, G. B., et al., "The Stability of Arsenic–Bearing Residues," Paper presented at TMS–AIME Symposium, "Arsenic Metallurgy–Fundamentals and Application," Phoenix, Arizona Jan. 25–29, 1988.

Hulanicki, A., et al., "Complexation Reactions of Dithiocarbamates," Department of Inorganic Chemistry, University of Warsaw, Poland, *Talanta Review,* 1967, vol. 14, pp. 1371 to 1392.

Janssen, M. J., "The Stability Constants of Metal Complexes of Some N–Dialkyldithiocarbamic Acids," Institute for Organic Chemistry T.N.O, Utrecht, the Netherlands), 75 (1956) *RECUEIL* 1411.

Janssen, M.J., "The Stability Constants of Metal Complexes of Some N–Dialkyldithiocarbamic Acids," Institute for Organic Chemistry T.N.O, Utrecht, the Netherlands), 76 (1957) *RECUEIL* 827.

Joris, Serge J., et al. "On the Monobasic or Dibasic Character of Dithiocarbamic Acids," Department of Chemistry, Carleton University, Ottawa 1, Ontario, *Analytical Chemistry,* vol. 41, No. 11, Sep. 1969.

Miertuš, Stanislav, et al., "Theoretical Study of the Electron Structure and Properties of Dithiocarbamates and Their Complexes With Transition Metals," [a] Department of Analytical Chemistry, Slovak Technical University, 812.37 and [b] Cancer Research Institute, Slovak Academy of Science, 812.32 Bratislava, *Collection Czechoslovak Chem. Commun.* [vol. 49] 1984.

Scharfe, R. R., et al., "Stability of Metal Dithiocarbamate Complexes," Department of Chemistry, Carleton University, Ottawa, Ontario K1S 5B6, Canada.

Tetsumi, T., et al., "Direct Reaction of Metal Powders With Several Sodium Dithiocarbamates," Department of Pharmaceutical Sciences, Setsunan University, Nagao Toge–cho, Hirakata–shi, Osaka 5730–01, Japan.

Tetsumi, T., et al., "Reaction of Copper Powder With Tetraalkylthiuram Disulphides," Department of Pharmaceuticals Sciences, Setsunan University, Nagao Tohge–cho, Hirakara–shi, Osaka 573–01, Japan.

Wasay, S. A., et al., "Removal of Trace Heavy Metals by Metal Chelates," *Inter J. Environment Studies,* 1990, vol. 36., pp. 191–197.

Cattaneo, Jeffrey F., "Removal Of Copper Ions From Rinse Water Using $TiO_2$ Photocatalysis", *SSA Journal,* vol. 13—Spring 1999, pp. 55–59.

Duyvesteyn, W.P.C. et al., "Ammonia Leaching Process for Escondida Copper Concentrates," pp. C125–C140, reprinted by Extractive metallurgy of Copper, Nickel and Cobalt, vol. I: *Fundamental Aspects,* edited by Reddy R.G. and Weizenbach R.N. (Warrendale, PA: The Minerals, Metals and Materials Society, Inc. (TMS), 1993).

Egermeier, John, et al., "Treatment of Wastewater Generated by Copper Metalization and CMP," Proceedings of Watertech '99 Executive Form, Oct. 5–6, 1999, Portland, Oregon.

Maeda, Bruce T. et al., "Treating Wastes Generated by Copper Electroplating Tools", *MICRO,* Sep. 1999, pp. 39–49.

Mendicino, Laura, et al., "The Environment, Health and Safety Side of Copper Metalization," *Semiconductor International,* Jun. 1998, pp. 105–106, 108, and 110.

Treasure, Tony, "The EMEW Cell" Engineered and Ready to Take on New Markets, Randol Copper Hydrometallurgy Forum, Vancouver, 1998, pp. 1–25.

Won, C.W. et al., "Recovery of Copper from –Etchant Solution by Electrowinning and Cementation," *Metallurgical Transactions,* vol. 24B, Feb. 1993, pp. 192–197.

K. Scott, Handbook of Industrial Membranes, First Edition, p. 85.*

* cited by examiner

PROCESS FOR TREATING AQUEOUS WASTE CONTAINING COPPER AND COPPER CMP PARTICLES

BACKGROUND OF THE INVENTION

This invention relates in general to a process for treating aqueous waste. More particularly, this process involves treating a copper plating waste stream, a copper rinse stream, and a copper waste stream resulting from chemical mechanical planarization (CMP).

Chemical mechanical planarization (CMP) is a new method of applying copper to semiconductors. In fact, using copper to make semiconductors is new to the industry. Currently, because CMP is a new process, copper waste is merely drummed and shipped off. Similar wastewater created in other industries, such as the plating industry or the printed circuit board industry, generally is treated in an electrowinning process to remove copper. The disadvantage with such a process is that, because particles suspended in the copper CMP wastewater are not removed before the electrowinning process, the separated copper is impure. Another disadvantage with electrowinning the copper CMP wastewater is that the concentration of copper may be too low for effective electrowinning. Still further, utilizing accepted techniques, multiple streams from various processes are not currently treated in an interdependent system.

Other methods of removing metals from wastewater include precipitation of the metals as their oxides, as is well known in the art. The precipitated metals are removed from the water by filtration methods such as bag filtration, ultra filtration, or microfiltration. However, such methods suffer from the fact that they can produce a hazardous sludge, which has no value, and that they do not remove any metals which remain soluble. In fact, disposing of hazardous sludge costs more than disposing of typical sludge due to its hazardous nature.

Thus, a process for treating wastewater containing copper CMP particles is needed which can overcome the above disadvantages. Specifically, a process is needed that will separate impurities from the copper CMP wastewater before the electrowinning step of the process. In addition, a system that is able to simultaneously treat waste streams from copper plating, copper rinse, and copper CMP processes is also needed. Furthermore, a process which does not produce a hazardous sludge would be preferable. In addition, a process which recovers the copper in a form which has value, such as metallic copper, would be preferred.

SUMMARY OF THE INVENTION

It is an object of the present invention to provide a process for treating aqueous waste containing copper CMP particles that allows basically pure copper to be recovered from the wastewater.

Another object of the present invention is to provide a process for simultaneously treating a copper plating waste stream, a copper rinse stream, and a copper waste stream resulting from chemical mechanical planarization.

It is another object of the present invention to provide for treating aqueous waste from a variety of sources including wastewater created by a chemical mechanical planarization process.

According to the present invention, the foregoing and other objects are achieved by a process for treating aqueous waste from copper plating, copper rinsing, and copper CMP processes. Another aspect of the present invention is a system for performing the above-described process.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENT

This process generally relates to wastewater created in making semiconductors. More specifically, there is a copper plating step when making semiconductors where copper metal is deposited onto a wafer, and wastewater containing copper is created during this step. The plating baths used in the plating step may also have chelants, such as ethylenediamine tetraacetic acid (EDTA), in them. The copper plating wastewater is one stream that is treated by the process of the present invention. Still further, there is a chemical mechanical planarization (CMP) step, which involves making a smooth surface on a layer of a semiconductor chip before depositing the next layer. The chemical mechanical planarization process generally involves using a slurry of either alumina and/or silica particles in water for grinding out and polishing the surface. The polishing step produces a relatively concentrated waste stream of CMP particles. After the polishing step, the surface is rinsed to remove excess copper and alumina particles and/or silica particles on the surface. This first rinse creates another waste stream, namely a copper CMP stream, which is treated by the process of the present invention. A second rinse creates a more dilute stream referred to infra as a copper rinse stream, which is also treated by the process of the present invention. The process of the present invention is able to simultaneously treat a copper plating stream, a copper rinse stream, and a copper CMP stream in an interdependent process.

The following chart shows typical properties for each of these three streams:

| Constituent | Cu Plating | Cu CMP | Cu Rinse |
| --- | --- | --- | --- |
| flow gpd | <100 | <100,000 | <200,000 |
| pH | 1–2 | 3–9 | 7–11 |
| Total Cu | ≦20,000 | <200 | <20 |
| Dissolved Cu | ≦20,000 | <200 | <20 |
| Total Suspended Solids (TSS) | <2,000 | <250,000 | <100 |
| Total Dissolved Solids (TDS) | <300,000 | <100,000 | <2,000 |
| Calcium | <150 | <10 | <30 |

-continued

| Constituent | Cu Plating | Cu CMP | Cu Rinse |
| --- | --- | --- | --- |
| Iron mg/l | <0.1 | <10 | <5 |
| Nitrates | <1,000 | <10 | <1 |
| Chlorides | <150 | <10 | <100 |
| Sulfates | <500,000 | <150 | <75 |
| Total Organic Carbon (TOC) | <3,500– | <1,000 | <50 |
| Citric Acid | | <200 | <50 |
| Oxalic acid | | <1,000 | <100 |
| Ammonium | | <1,000 | <500 |

All concentrations are in mg/l unless otherwise noted.

In addition, there may also be a test wafer reclaim stream that is treated along with the copper plating stream. This wafer reclaim stream (Cu WR) results from making test semiconductor wafers and then stripping copper off the test wafers. The copper removed from the test wafers goes into the wafer reclaim stream. Typical properties of this stream are as follows:

| Constituents | Cu WR |
| --- | --- |
| Flow gpd | <30 |
| pH | <3 |
| Total Cu | <2,000 |
| Dissolved Cu | <2,000 |
| Sulfates | <35,000 |

All concentrations are in mg/l unless otherwise noted.

Figures 1, 2:
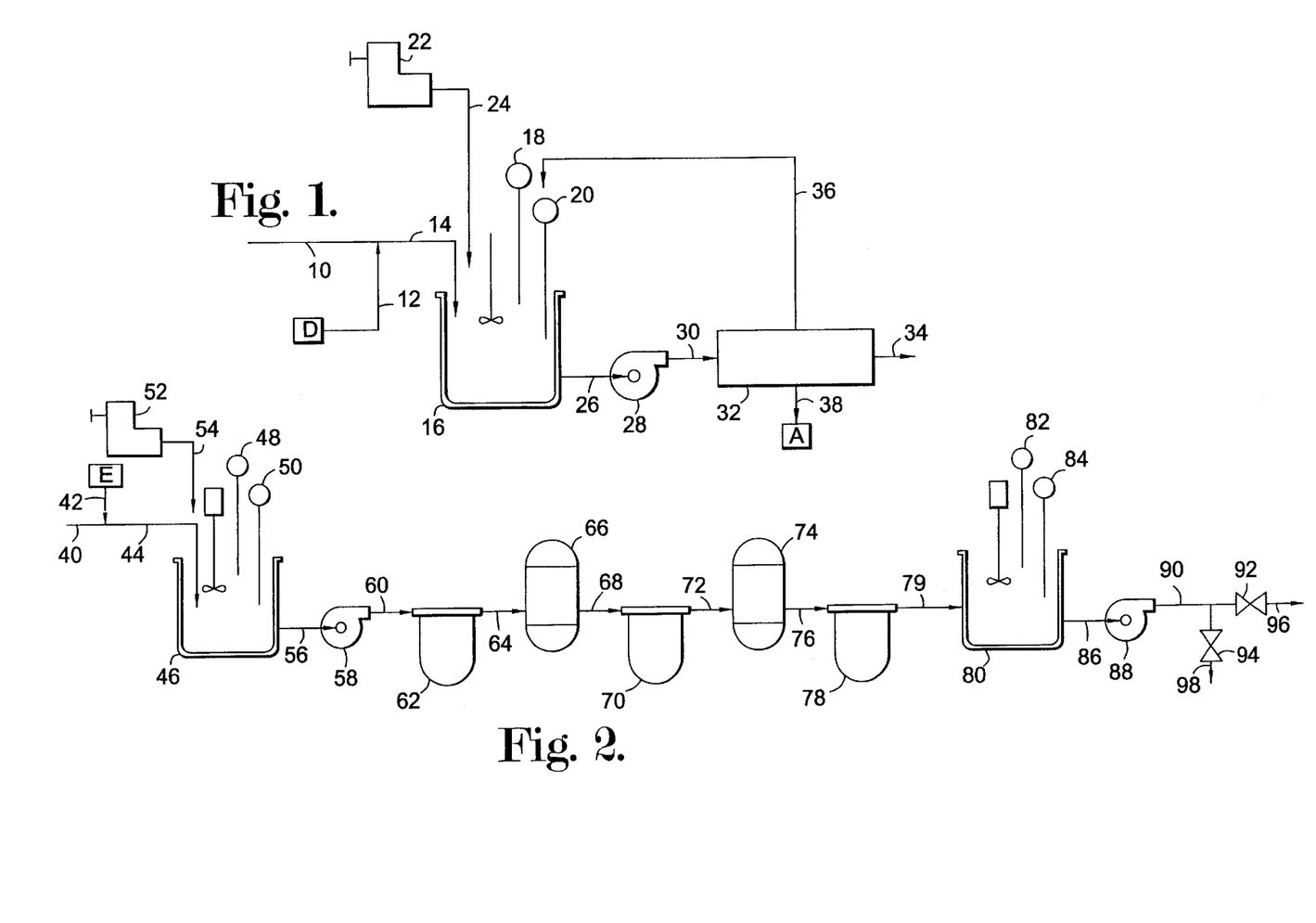
FIG. 1 is a schematic representation of the part of the aqueous waste treatment plant of the present invention which is used for treating a copper plating waste stream.
FIG. 2 is a schematic representation of the part of the aqueous waste treatment plant of the present invention which is used for treating a copper rinse waste stream.

Referring to FIG. 1, a copper plating stream is fed through line 10. Line 12, which contains concentrated regenerant D, is connected to line 10. Lines 10 and 12 are combined together in line 14 which is fed into tank 16. A copper wafer reclaim stream (not shown) may also be fed into line 14. A wastewater solution is held in tank 16. The pH of tank 16 is monitored with pH control 18, and the level of tank 16 is monitored with level control 20. The pH of tank 16 is adjusted by pumping either an acid or a base through a pump 22 and into line 24, which is fed into tank 16. The solution in tank 16 exits through line 26 and is fed through pump 28 into line 30, which carries it to electrowinning chamber 32. Electrowinning chamber 32 includes both cathodes and anodes (not shown). Metallic copper forms on the cathodes and is periodically removed from the electrowinning chamber. The metallic copper exiting the electrowinning chamber is represented by line 34. Some of the solution in electrowinning chamber 32 exits the chamber and is recycled to tank 16 via line 36. Some of the solution exits electrowinning chamber 32 through line 38 as blow down and is referred to as stream A.

The next part of the process is shown in FIG. 2. Line 40 carries a copper rinse stream. Dilute regenerant E is carried in line 42 which is connected to line 40. These combined streams are carried in line 44 to first tank 46. This wastewater solution is held in tank 46. pH control 48 monitors the pH of the solution in first tank 46, and level control 50 monitors the level of the tank. Pump 52 feeds an acid or base to line 54, and line 54 feeds the acid or base to first tank 46 so as to adjust the pH of the solution in the tank. The solution exits first tank 46 through line 56 and is pumped through pump 58 into line 60. From line 60 it is carried through cartridge filter 62. Line 64 then carries the solution from cartridge filter 62 to carbon bed 66. Line 68 then feeds the solution from carbon bed 66 to cartridge filter 70. The solution exits cartridge filter 70 via line 72, and then the solution is fed into disposable resin chamber 74. Line 76 carries the solution from disposable resin chamber 74 to cartridge filter 78. Still another line 79 carries the solution from cartridge filter 78 to second tank 80. The conductivity of the solution in third tank 80 is monitored by conductivity meter 82, and the copper content of this solution is measured by copper detecting meter 84. The solution exits second tank 80 in line 86 and is pumped through pump 88 into line 90. Valves 92 and 94 determine whether the solution is diverted and retreated or reused. If valve 92 is open and valve 94 is closed, the solution exits in line 96 as reclaim water or is drained for disposal or further treatment. If valve 92 is closed and valve 94 is open, the solution exits as diversion through line 98 to tank 46.

Figure 3A:
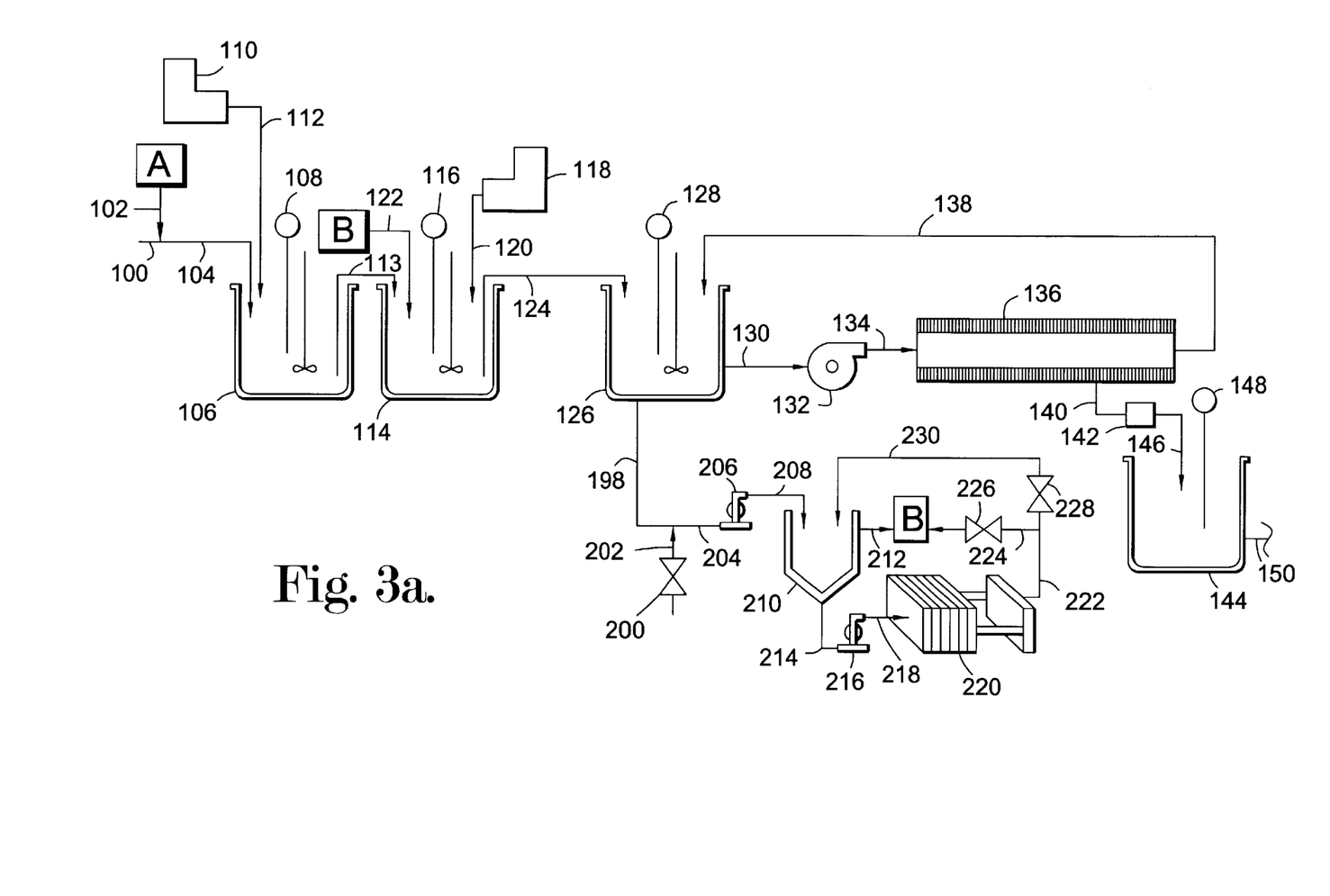
FIG. 3 is a schematic representation of the part of the aqueous waste treatment plant of the present invention which is used for treating a copper CMP waste stream.
Figure 3B:
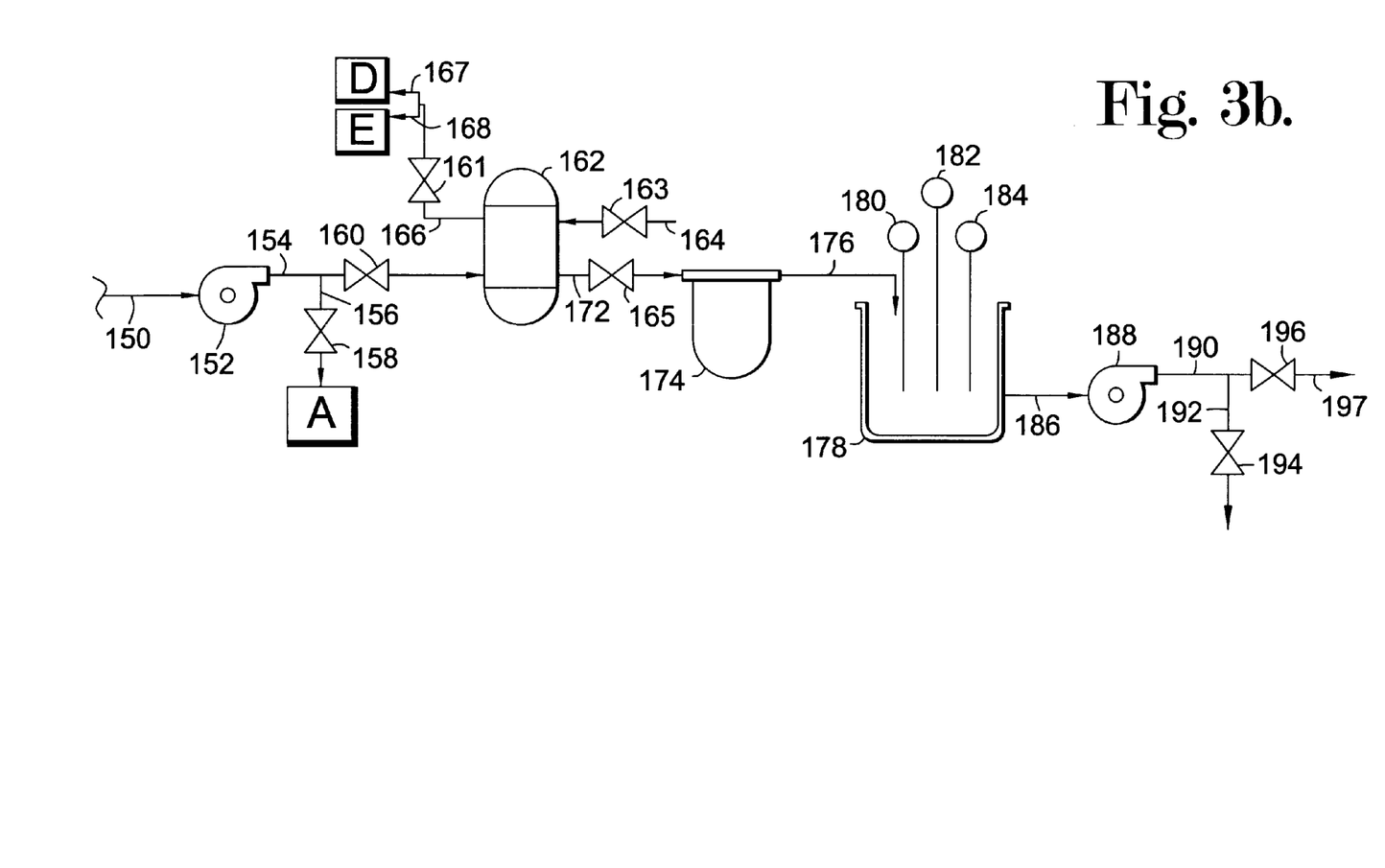

Referring to FIG. 3, a copper CMP stream is carried by line 100. Stream A is fed into the copper CMP stream by line 102. Stream A and the copper CMP stream are combined into one stream in line 104. Line 104 carries the stream into first tank 106. The pH of the solution in first tank 106 is measured by pH control 108. Pump 110 moves either acid or base through line 112 and into first tank 106 to adjust the pH of the solution. The solution from first tank 106 is fed into second tank 114 through line 113. The level of second tank 114 is monitored by level control 116. Pump 118 pumps polymer through line 120 and into second tank 114. Solution B is also fed into second tank 114 through line 122. Line 124 feeds solution from second tank 114 to third tank 126, which is the concentration tank. The level of third tank 126 is monitored by level control 128.

Solution exits third tank 126 through line 130 and is pumped through pump 132 into line 134. Line 134 feeds the solution into microfiltration skid 136. The filtered solids from microfiltration skid 136 are recycled through line 138 back to third tank 126. The filtered solution exits the microfiltration skid 136 via line 140 and enters turbidity meter 142 and then is fed into fourth tank 144 through line 146. The level of fourth tank 144 is controlled by level control 148. The solution exits fourth tank 144 in line 150 and is pumped through pump 152 to line 154. Line 156 splits off of line 154 and has a valve 158 attached thereto. Stream A may exit through valve 158. Line 154 also continues through valve 160 and is fed into ion exchange column 162. A regeneration stream is also fed into ion exchange column 162 through line 164. Line 166 caries a stream exiting ion exchange column 162. This stream is separated into a concentrated regenerant D that exits in line 167 and a dilute regenerant E that exits in line 168. The purified stream exits the ion exchange column in line 172 and is passed through filter 174 and into line 176 which feeds the solution into fifth tank 178. The level of the tank is controlled by level control 180. The copper in the solution is monitored by copper detecting meter 182 and the conductivity of the solution is measured by conductivity meter 184. The solution exits the tank through line 186 and is pumped through pump 188 and into line 190. Line 192 branches off from line 190 and valve 194 controls the flow of the stream leaving through line 192. Valve 196 controls the flow leaving through line 197.

Sludge also exits third tank 126 through line 198. Clean water from line 194 is pumped through valve 200 and into line 202 which connects with line 198 to form line 204. Line 204 is then pumped through valve pump 206 and into line 208, which feeds the sludge and water into sludge tank 210. Liquid exits sludge tank 210 through lines 212 and 214. Solids settle to the bottom of sludge tank 210. The liquid that has more solids in it exits through line 214 and therefore needs to be further treated. It is pumped through pump 216 into line 218 which feeds it into a filtering device 220 that removes solids from the liquor. This filtering device may be any one of several conventional filtering devices such as a belt press, a filter press, or a centrifuge. Liquor exits the filtering device through line 222 and then is directed either through line 224 and valve 226 or is directed through valve 228 into line 230 and back to sludge tank 210. If the liquor flows through valve 226 it is combined with the liquid exiting sludge tank 219 in line 212. These streams form a liquid containing some copper that is designated as solution B. Solution B may be recycled so as to enter second tank 114 through line 122, as shown in FIG. 3.

Tank 16 may also include a copper wafer reclaim stream in addition to the copper plating waste stream and the concentrated regenerant D that exits the ion exchange column in line 167, as shown in FIG. 3. Preferably, the pH of tank 16 is kept between about 2 and 6. Most preferably, the pH in this tank is between about 3 and 4. The pH is kept low so as to keep the copper in solution. Preferably, the pH of the solution is adjusted by adding sulfuric acid ($H_2SO_4$) or sodium hydroxide (NaOH). Diaphragm pumps, designated by numeral 22, may be used to pump the acid or base into the tank. Preferably, the temperature of the solution in the tank is about 23 to 40° C.

This solution is then pumped to an electrowinning chamber. The electrowinning chamber has at least one anode and cathode in it. An electric potential is applied across the anode/cathode pair such that copper plates on the cathode. Preferably, a current density of about 25 to 150 amps per square meter is used. Typically, the flowrate through the electrowinning chamber is about 25 to 35 gallons per minute. The temperature of the stream being treated should be about 20 to 40° C. The pressure of the chamber should be between about 1 and 2 atmospheres. Preferably, the electrowinning chamber has a cylindrical or tubular cathode because such a configuration keeps oxygen and hydrogen that is produced in the electrowinning process in the stream being treated until these gases can be safely sent to a scrubber. Most preferably, the electrowinning chamber is an EMEW unit that can be obtained from Electro-metal Mining Limited of Ashmore, Queensbury, Australia.

Copper gathers on the cathodes in the electrowinning chamber, and about every three days, the electrowinning process is stopped, the chamber is opened up, and the metallic copper is scraped or pried from the cathode and removed. Alternatively, copper powder is filtered from the solution. Two streams of liquid exit the electrowinning chamber. Both of these streams contain less copper than the copper plating waste stream, the concentrated regenerant, and the copper wafer reclaim stream. One of these streams is recycled to tank 16 through line 36. The other stream exits the electrowinning chamber through line 38 and is combined with the copper CMP stream that is fed into tank 106.

Dilute regenerant E, which is carried in line 168 to line 42, is combined with a copper rinse stream and both are added to tank 46 via line 44. The pH of tank 46 is adjusted in the same manner as tank 16, but it is kept in a pH range of between about 5 and 9 and preferably between about 6 and 8. The mixture in tank 46 is pumped through a first cartridge 62 equipped with about a 0.1 to 50 micron filter. The stream is then fed through a carbon bed which reduces the total organic carbon content of the stream. The carbon bed also removes hydrogen peroxide from the stream. Following this, the stream is fed through a second cartridge equipped with about a 0.1 to 5 micron filter.

Then, the stream is fed through a disposable resin chamber 74 where it is treated with an adsorbent housed in the disposable resin chamber to further remove copper from the stream. The adsorbent used is an alumina hydroxide base or an alumina oxide base that is able to absorb copper and other contaminants and thereby purify the stream. Preferably, the adsorbent is an acid enhanced particle that is able to bind tightly to copper and other contaminants. This adsorbent particle can be made by contacting a non-amorphous, non-ceramic, crystalline, porous, calcined, aluminum oxide particle that was calcined at a particle temperature of from 300° C. to 700° C., with an acid for a sufficient time to increase the adsorbent properties of the particle. This adsorbent is not regenerated when its capacity is reached. Most preferably, the adsorbent is obtained from Project Earth, Inc. of Atlanta, Ga. and is sold under the trademark Aqua-Bind.

The treated stream then is fed to a third cartridge having about a 0.1 to 1 micron filter. The stream exits this third filter and is fed into tank 80 where conductivity meter 82 and copper detecting meter 84 measure, respectively, the conductivity and copper level of the solution in tank 80. Conductivity is measured to determine the amount of ions, such as copper ions, dissolved in the treated wastewater. If conductivity and copper levels are acceptable, the solution in tank 80 is pumped through valve 92 and into line 96 and is suitable for use within the plant, such as in cooling towers and scrubbing operations. It also may be drained. On the other hand, if the conductivity or copper levels are too high, pump 88 pumps the stream through valve 94 and into line 98 where the stream is diverted for retreatment.

As discussed above, the blow down stream A carried by line 38 is combined with the copper CMP waste stream and fed into tank 106. The pH of this tank is kept in the same range and in the same manner as the pH of tank 16. The solution in tank 106 is then transferred to tank 114, and liquid containing copper that is obtained from the sludge tank and which is designated as solution B is added to tank 114. A flocculant or coagulant is also added to tank 114 through line 120. Flocculants and polymers are known in the arts. Their use enables the production of particles which are more easily filterable. Flocculants and coagulants which do not cause dissolved copper to precipitate as a solid copper species are preferred. More preferred are flocculants KSP™ 10E and KSP™ 340, products of Koch Microelectronic Services Co., Inc., Houston, Tex. The solution in tank 114 is then transferred to tank 126, which is a concentration tank. Concentrated solids of the CMP stream exit tank 126 through line 198. Meanwhile, liquid exits tank 126 through line 130 and is pumped through a microfiltration skid 136. Preferably, microfiltration skid 136 is a membrane module mounted on a mobile frame. Preferably, the membrane is made of a polyolefin or a polysulphone. Some liquid exiting the microfiltration skid contains concentrated solids and is recycled back to concentration tank 126 through line 138. Other more pure liquid exiting microfiltration skid 136 exits through line 140 and into turbidity meter 142. The copper is kept soluble by keeping the pH low so that concentrated solids generated by microfiltration will be relatively free from copper. The inlet pressure for liquid entering microfiltration skid is about 20 to 50 psig. The outlet pressure of the liquid exiting the microfiltration skid through line 140 and entering turbidity meter 142 is about 0 to 15 psig. The recycle line 138 has a pressure that is about 15 psig lower than the inlet pressure.

Turbidity meter 142 measures the solids that are in this stream by detecting the cloudiness of the stream. If there is too much cloudiness, it means the membrane in the microfiltration skid is not working properly. If the turbidity meter shows that the water is not sufficiently clean then the water is pumped through pump 152 and then diverted through valve 158 and is combined with the blow down stream A from the electrowinning chamber 32, shown in FIG. 1, for reprocessing. If the turbidity meter indicates that the water is sufficiently clean, it is allowed to pass through valve 160 and into ion exchange column 162.

The ion exchange column 162 is charged with ion exchange resin from line 164, using methods known in the art. When copper levels rise above 20–30 ppm, it is not economical to use the copper-specific disposable adsorbent used in the disposable resin chamber. Instead, a regenerable organic cation exchange resin in the hydrogen form should be used as the ion exchange resin. This resin can be regenerated using dilute sulfuric acid. The ion exchange resin used in the ion exchange column should be a copper chelating resin. Suitable chelating resins may be bought from Bayer of Pittsburgh, Pa. under the name TP207 or from Rohm & Haas of Philadelphia, Pa. under the name IRC718. Preferably, the resin has an operating pH between about 3 and 4. Usually, the throughput of the ion exchange bed is about 8 to 40 bed volumes per hour. The temperature of the ion exchange column is approximately ambient temperature. When the ion exchange resin has reached its copper-containing capacity, it must be regenerated using dilute sulfuric acid. To regenerate the column, valves 160 and 165 are closed and valves 163 and 161 are opened. Dilute sulfuric acid is passed through line 164 with counter current flow direction in relation to the copper containing stream. The regenerant stream exits through valve 161 and line 166. When the regeneration is complete, valves 163 and 161 are closed and valves 160 and 165 are opened, and the prior operation is restarted. Both concentrated regenerant D and dilute regenerant E are created in the ion exchange column. Concentrated regenerant D comprises the first 2 to 3 bed volumes (approximately) of the regeneration of the ion exchange column, and dilute regenerant E comprises the next approximately 5 bed volumes. As discussed previously, concentrated regenerant D is fed into the copper plating waste stream, as shown in FIG. 1. The dilute regenerant stream E is fed into the copper rinse line, as shown in FIG. 2. The ion exchanged effluent exits the ion exchange column through line 172 and is fed through cartridge filter 174. The conductivity and copper of this stream is then measured in tank 178. Depending upon these readings, the stream is either pumped through valve 196 so as to be drained or used as a filter cake wash, i.e. as "clean water". Alternatively, if conductivity or copper levels are too high, the ion exchange resin is diverted by valve 194 to resin feed tank 144.

The coagulants, flocculants, and other solids that exit concentration tank 126 through line 128 are pumped into a sludge tank. Preferably, the copper that enters the sludge tank is in solution. Clean water from the ion exchange effluent is also added to the sludge tank via line 202 so as to dissolve solids, displace high copper content water with low copper content water in the sludge, and rinse down the sides of the sludge tank. Solids are gathered in the sludge tank in a solid filter cake, which is periodically removed. Liquid exits the sludge tank through line 212. This liquid has some copper in it and is designated as solution B. Liquid that has more solids in it exits the sludge tank through line 214 and is then pumped through a belt press, a filter press, and/or a centrifuge so as to remove solids. The liquor that exits the filter is either combined with solution B or if it contains too high of a solid content, is recycled to sludge tank 210. Solution B is added to tank 114, as shown in FIG. 3.

The following examples provide information about a system which is within the scope of this invention. These examples are not meant in any way to limit the scope of this invention.

EXAMPLE 1

The following table shows the composition of streams that may be treated by the system of the present invention.

| Constituents | Cu Plating | Cu WR | Cu Rinses | Cu CMP |
|---|---|---|---|---|
| flow gpd | 100 | 30 | 200,000 | 100,000 |
| pH | 1 | ≦2 | ≦11 | ≦9 |
| TSS | 84–1000 ppm | | 0–60 ppm | 50–300,000 ppm |
| Cu | 1000–2000 ppm | 100–3000 ppm | 0–1400 ppm | 0–100 ppm |
| $NH_4^+$ | ND | | 1 ppm | 50 ppm |
| $SO_4^{2-}$ | 430,000 ppm | 35,000 ppm | 10 ppm | 30 ppm |
| Total Organic Carbon (TOC) | 3500 ppm | | 25 ppm | 300 ppm |

These streams described above are treated according to the process described in the Detailed Described of the Preferred Embodiment.

EXAMPLE 2

The following table shows the composition of various streams that were treated by the system of the present invention.

| Test | units | Cu CMP | Cu Plating | Cu Rinse |
|---|---|---|---|---|
| TOC | ppb | 163,000 | 600,000 | 58 |
| pH | | 6.8 | 1.0 | 9.5 |
| silica, dissolved | ppb | 1,700 | 2,700 | 3 |
| total dis. solids by cond. | ppm | 190 | 110,000 | 27 |
| total suspended solids | ppm | 740 | 84 | 5.3 |
| turbidity | ftu (= ntu) | 350 | 2 | 0 |
| Total Alkalinity | mg as CaCO3 | 110 | <1 | 67 |
| Anions by IC | | | | |
| formate | ppb | 13,000 | * | * |
| chloride | ppb | 500 | * | * |
| nitrate | ppb | 5,200 | * | * |
| sulfate | ppb | * | 40,000,000 | * |
| Cations by IC | | | | |
| sodium | ppb | 360 | * | * |
| ammonium | ppb | 29,000 | * | 9,600 |
| potassium | ppb | 2,400 | * | * |
| TM by ICP-MS | | | | |
| aluminum | ppb | 11,000 | * | * |
| calcium | ppb | 220 | * | * |
| copper | ppb | 2,600 | 3,800,000 | 22 |
| magnesium | ppb | 9 | 330 | * |
| nickel | ppb | 1 | * | * |
| potassium | ppb | 1,700 | * | * |
| sodium | ppb | 440 | 2,200 | * |
| titanium | ppb | 3 | * | * |
| zinc | ppb | 3 | * | * |

* element not > DL

These streams described above were treated according to the process described in the Detailed Description of the Preferred Embodiment. The solution exiting line 96, shown in FIG. 2, had a copper content that was less than 0.2 ppm after 400 bed volumes. The stream exiting line 197, shown in FIG. 3, had a copper content that remained below 0.14 ppm after 900 bed volumes.

From the foregoing, it will be seen that this invention is one well adapted to attain all the ends and objects herein-above set forth together with other advantages which are obvious and inherent to the process. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A process for treating aqueous waste comprising a copper plating waste stream, a copper rinse stream containing organic carbon and solid particles, and a copper chemical mechanical planarization (CMP) stream containing solid particles, said process comprising:

electrowinning said copper plating waste stream to remove copper and create a blow down stream;

filtering said rinse stream to remove solid particles;

adding said blow down stream to said CMP stream;

treating said blow down stream and said CMP stream with a flocculant or a coagulant to form larger solid particles;

removing said larger solid particles from said CMP stream and separating the resulting liquid with an ion exchange resin in an ion exchange column wherein a liquid containing copper, a concentrated regenerant, and a dilute regenerant alternately exit said column;

adding said concentrated regenerant to said waste stream before said electrowinning step;

adding said dilute regenerant to said rinse stream before filtering to remove solid particles; and adding a portion of said liquid containing copper to said CMP stream during said treating step.

2. The process of claim 1, further comprising:

adjusting the pH of said copper plating waste stream to about 2 to 6 before electrowinning said stream.

3. The process of claim 2, further comprising:

adding a copper wafer reclaim stream to said waste stream before adjusting the pH of said stream.

4. The process of claim 1, wherein said filtering step comprises passing said rinse stream through a first filter, then through a carbon bed, and then through a second filter.

5. The process of claim 4, wherein said filtering step further comprises passing said rinse stream through a disposable resin chamber and then through a third filter.

6. The process of claim 4, wherein the step of passing said rinse stream through said carbon bed reduces the total organic carbon content of said rinse stream.

7. The process of claim 5, wherein the step of passing said rinse stream through said disposable resin chamber further comprises housing an adsorbent in said disposable resin chamber.

8. The process of claim 5, wherein said filtering step comprises filtering out particles greater than about 0.1 to 50 microns with first filter, filtering out particles greater than about 0.1 to 5 microns with said second filter, and filtering out particles greater than about 0.1 to 1 micron with said third filter.

9. The process of claim 1, further comprising:

adjusting the pH of said CMP stream to about 2 to 6 before treating said CMP stream with said flocculent or said coagulant.

10. The process of claim 9, further comprising:

removing liquid containing copper from said larger solid particles; and filtering said resulting liquid.

11. The process of claim 10, further comprising:

removing copper from said resulting liquid by treating said resulting liquid with an ion exchange resin in an ion exchange column wherein a regenerant stream and an ion exchange effluent alternately exit said column; and separating said regenerant stream into said concentrated regenerant and said dilute regenerant.

12. The process of claim 11, further comprising:

filtering out particles in said ion exchanged effluent greater than about 0.1 to 50 microns.

13. A process for treating aqueous waste comprising a copper plating waste stream, a copper rinse stream containing organic carbon and solid particles, and a copper chemical mechanical planarization (CMP) stream containing solid particles, said process comprising:

electrowinning said copper plating waste stream to remove copper and create a blow down stream;

filtering said rinse stream to remove solid particles, wherein said filtering step comprises passing said rinse stream through a first filter, through a carbon bed, through a second filter, through a disposable resin chamber wherein an acid enchanced particle absorbent is housed therein and through a third filter;

adding said blow down stream to said CMP stream;

treating said blow down stream and said CMP stream with a flocculant or a coagulant to form larger solid particles;

removing said larger solid particles from said CMP stream and separating the resulting liquid with an ion exchange resin in an ion exchange column wherein a liquid containing copper, a concentrated regenerant, and a dilute regenerant alternately exit said column;

adding said concentrated regenerant to said waste stream before said electrowinning step;

adding said dilute regenerant to said rinse stream before filtering to remove solid particles; and adding a portion of said liquid containing copper to said CMP stream during said treating step.

14. A system for treating waste comprising a copper plating waste stream a copper rinse stream containing organic carbon and solid particles, and copper CMP stream, said system comprising:

an electrowinning chamber for receiving said copper plating waste stream wherein a blow down stream is created in said chamber;

a filter for receiving said copper rinse stream;

a concentration tank for receiving said copper CMP stream and said blow down stream wherein sludge and liquid exit said tank;

a sludge tank for receiving sludge from said concentration tank;

a microfilter for receiving liquid from said concentration tank;

an ion exchange column in fluid communication with said microfilter;

a conduit for passing a regeneration stream to said ion exchange column;

wherein a concentrate regenerant and a dilute regenerant are created in said ion exchange column;

a conduit in fluid communication with said ion exchange column for passing diluted regenerant to said filter receiving said copper rinse stream and a conduit in fluid communication with said ion exchange column passing concentrated regenerant to said electrowinning chamber.

15. The system of claim 14, further comprising:
a carbon bed in fluid communication with said filter.

16. The system of claim 14, further comprising:
a disposable resin chamber in fluid communication with said filter.

17. A process for treating aqueous waste comprising a copper plating waste stream, a copper rinse stream containing organic carbon and solid particles, and a copper chemical mechanical planarization (CMP) stream containing solid particles, said process comprising:

adjusting the pH of said copper plating waste stream to about 2 to 6;

electrowinning said copper plating waste stream to remove copper and create a blow down stream and a stream that is recycled and combined with said copper plating waste stream;

filtering said rinse stream to remove solid particles by passing said rinse stream through a first filter, through a carbon bed to reduce the total organic content of said rinse stream, through a second filter, through a disposable resin chamber wherein an adsorbent is housed in said disposable resin chamber, and through a third filter;

adding said blow down stream to said CMP stream;

adjusting the pH of said CMP stream to about 2 to 6;

treating said blow down stream and said CMP stream with a flocculant or coagulant to form larger solid particles;

removing said larger solid particles from said CMP stream;

removing said liquid containing copper from said flocculants;

filtering said liquid containing copper;

removing copper from said resulting liquid by treating said resulting liquid with an ion exchange resin in an ion exchange column wherein a concentrated regenerant, a dilute regenerant, and an ion exchanged effluent comprising said copper alternately exit said column;

adding said concentrated regenerant to said waste stream before said electrowinning step;

adding said dilute regenerant to said rinse stream before filtering to remove solid particles; and adding a portion of said liquid containing copper to said CMP stream during said treating step.

* * * * *